US005559496A

United States Patent [19]

Dubats

[11] Patent Number: 5,559,496

[45] Date of Patent: Sep. 24, 1996

[54] REMOTE PATROL SYSTEM

[76] Inventor: William C. Dubats, 12967 Crooked Lake La., Coon Rapids, Minn. 55448

[21] Appl. No.: 64,766

[22] Filed: May 19, 1993

[51] Int. Cl.[6] .............................. G08B 1/08; H04Q 7/00

[52] U.S. Cl. .............................. 340/539; 340/525; 340/541; 340/557; 340/565; 250/338.1; 250/ DIG. 1; 348/143; 348/155; 348/164

[58] Field of Search .............................. 340/517, 521, 340/522, 525, 539, 541, 565, 937, 556, 600, 555, 557; 348/143, 152–155, 163, 164; 250/DIG. 1, 338.1

[56] References Cited

U.S. PATENT DOCUMENTS

| | | | |
|---|---|---|---|
| 3,634,846 | 1/1972 | Fogiel | 340/521 |
| 4,081,830 | 3/1978 | Mick et al. | 348/155 |
| 4,272,762 | 6/1981 | Geller et al. | 340/556 |
| 4,434,363 | 2/1984 | Yorifuji et al. | 340/556 |
| 4,577,183 | 3/1986 | Fontaine et al. | 340/541 |
| 4,651,143 | 3/1987 | Yamanaka | 340/521 |
| 4,665,385 | 3/1987 | Henderson | 340/521 |
| 4,736,097 | 4/1988 | Phillipp | 340/550 |
| 4,752,764 | 6/1988 | Peterson et al. | 340/323 R |
| 4,772,875 | 9/1988 | Maddox et al. | 340/522 |
| 4,857,912 | 8/1989 | Everett, Jr. et al. | 340/541 |
| 4,903,009 | 2/1990 | D'Ambrosia et al. | 340/556 |
| 4,947,353 | 8/1990 | Quinlan, Jr. | 364/562 |
| 5,159,315 | 10/1992 | Schultz et al. | 340/539 |
| 5,198,799 | 3/1993 | Pascale | 340/556 |
| 5,305,390 | 4/1994 | Frey et al. | 340/556 |

FOREIGN PATENT DOCUMENTS

| | | | |
|---|---|---|---|
| 0022716 | 1/1991 | Japan | 340/541 |

OTHER PUBLICATIONS

Conference: 1976 Carnahan Conference on Crime Countermeasures, Lexington, KY, USA, (May, 5–7, 1976).

Conference: 1980 Carnahan Conference on Crime Countermeasures. Lexington, KY, USA, May 14–16, 1980.

Conference: 1987 Carnahan Conference on Security Technology Electronic Crime Countermeasures, Lexington, KY, USA, (Jul. 15–17, 1987).

*Primary Examiner*—Jeffery Hofsass
*Assistant Examiner*—Daniel J. Wu

[57] ABSTRACT

A system for detecting the presence and passage of vehicle, pedestrian, or other intrusion and/or traffic within one or more monitored areas. The system detects intrusions of nontransparent objects which interrupt energy projections, records and stores data on certain characteristics of the intrusion(s), and transmits such data to a base station through a communication link. System estimates approximate size, speed and directional characteristics of intruding object(s) with an "expert system". Selected environmental data may be detected and transmitted along with intrusion data. Provision for photographing intruding objects is included. The base station provides user interfaces, processes intrusion data, reports activity, summarizes traffic data, prints reports and stores such data for future retrival. The intrusion detection system is based on energy projection, and does not require a physical presence such as air hoses, switches or inductive devices across the immediate span being monitored. Devices may be portable, easy to set up and useful for concealed monitoring applications.

17 Claims, 20 Drawing Sheets

REMOTE PATROL SYSTEM

BACKGROUND—FIELD OF INVENTION

The present invention is particularly useful in military patrol, industrial or commercial security applications, and border patrol situations. It relates to a system for detecting the presence of pedestrian and vehicular intrusion or traffic in specific areas selected for monitoring, and transmitting information related to incursions to a base station via a communication link. A camera and environmental sensors may be added to collect other data coincident with intrusions. A data log at remote monitor sites controls the recording and transmission of data to the base station. A computer and peripheral equipment at the base station operates in conjunction with related software to interpret the raw intrusion data and identify objects, giving approximate speed, direction of motion and certain size characteristics of traffic. User interface(s) and output devices provide warnings of intrusions, permit user access to information on traffic events, and allow the user to create historical data reports as required. Electronic memory devices store data for historical reference.

The Remote Patrol System (RPS) according to the present invention is intended primarily for applications involving low density traffic detection, identification and enumeration, and especially in locations where any volume of traffic may be viewed as an exception or unanticipated intrusion. The remote monitor(s) may be miniaturized and self contained, making the entire monitoring station(s) concealable. Monitored sites may be unmanned for lengthy periods after installation is complete. These characteristics make the RPS especially adaptable to surveillance of areas which may be difficult, expensive or dangerous to monitor with other means.

SUMMARY OF THE INVENTION

RPS consists of two physical groups: a base station and one or more remote monitors. Each of these groups has subsystem devices to perform detection, data logging, transmission, reception, data analysis and interpretation, data storage, and user interfaces.

A remote monitor consists of one or more object sensors, a data log, connecting cables, and a data transceiver. The object sensors utilize energy beams projected across a monitored area. Interruption of an energy beam initiates an "event" which is assigned time dates by a data log for both the initiation time and the termination time. An object sensor(s) consist of an emitter and a receiver which may be located on opposite sides of the monitored area in an opposed configuration, or located together with a parallel alignment to an opposed retroreflective surface. Alignment of the energy beam is approximately perpendicular to the axis of anticipated motion. Interruption of the energy beam by a non-transparent object triggers an "event" which is assigned a time "date " by the data log. Restoration of continuity to the beam completes the event, and is assigned a second time date in the data log. Remote monitors using a single object sensor have the basic capability of reporting the time and duration of an intrusion. The use of two object sensors having a known separation distance provides the instant invention with the added capabilities of imputing direction, approximate horizontal size, and average speed of the traffic or intrusion. Additional sensors to detect ambient temperature, and air borne chemical agents at the monitored site provide further inputs to the data log for subsequent transmission to the base station. An optional camera may be triggered by event initiation to record objects present in the monitored area.

A data log stores event/date information for subsequent transmission to the base station through a communication link. A CPU in the data log contains independent source code instructions. The communication link may consist of hardwired cable, radio frequency transmission or satellite link. Data transmissions may be serial and instantaneous to report events to the base station immediately upon occurrence. Alternately, burst transmissions may be selected to conserve power and avoid detection. Burst transmissions may be selectively set for regular, preset time intervals; triggered by the occurrence of a specified event; or triggered upon demand by the base station operator. Data on temperature and chemical agents may be sampled upon completion of an event. The instantaneous environmental data readings may be registered in the data log for transmission along with their related intrusion event data.

A base station consists of a transceiver, a microprocessor-based data processor unit computer, data conversion devices, software code instructions, one or more form of data storage devices, user interface devices, and output devices, all collectively referred to as a computer. The base station computer is served by contains both a nonvolatile Read Only Memory (ROM) storage device and a volatile Random Access Memory (RAM). Operating software instruction code is loaded to RAM upon base station startup allowing the computer to interpret event and date information received from monitored areas. Interpretation and analysis may consist of merely recording time and duration of intrusion, or may include estimates of speed, size, direction and identifying and classifying the probable nature of each intrusion event with summary words or phrases such as "pedestrian", "automobile", and "truck" and/or icon figures to represent the inferred nature of the object. The interpreted intrusion data may have associated environmental data.

User interface through devices such as a keyboard, mouse, digitizer pen, and display screen allows the operator to note intrusions as they occur, instruct monitored sites on the currently desired reporting mode, summarize and display event data for specified time periods, store data to nonvolatile magnetic media, and print reports of event activity at monitored sites, either present or historical.

PRIOR ART—REFERENCES CITED

A multitude of traffic counting devices are cited in the broad field of traffic monitoring. U.S. Pat. Nos. 3,397,305 and 3,397,306 by Auer disclose means to calculate average lane occupancy based on fixed detector loops buried in the highway surface. Like most of the references, such devices are capable only of local recording. In U.S. Pat. No. 3,549,869 Kuhn discloses the first of several portable traffic counters which may be unplugged and carried to another location for data analysis. A later, battery powered version of portable counter is Tyburski's U.S. Pat. No. 4,258,340. In U.S. Pat. No. 3,711,386, Apitz relates traffic count to normative levels. In U.S. Pat. No. 3,889,117 Shaw uses infrared radiation detection to produce TV like images of traffic objects. In U.S. Pat. No. 4,052,595 Erdmann and Kurschner show the use of multiple magnetic sensors buried in the highway to determine vehicle, count, speed and direction. These approaches are very different than the instant invention in detection method technology, remote-to-base communication and scope of area monitored. Deaton et. al disclose a portable device which relies on sensors already in place in U.S. Pat. No. 4,229,726.

The earliest disclosure noted relating to remote traffic data reporting is Shigeta and Matsumoto's U.S. Pat. No. 4,258,430. This patent discloses a refractive lens system of photoelectric elements to distinguish differing gray scale values caused by changes in relative brightness. Electronic interpretation of waveforms is used to impute traffic characteristics, and data may be transmitted via phone lines. This device, which must be visible, makes no attempt to ascertain speed or direction of travel. In U.S. Pat. No. 4,433,325, Tanaka et. al. disclose an optical system which generates on output video signal related to a specific traffic lane from overhead optics. Tanaka claims the ability to discern an actual vehicle from a mere shadow within the limited area being covered.

In U.S. Pat. No. 4,752,764 Peterson et. al. use a series of ultrasonic detectors to calculate an athlete's speed. Sobut discloses an analog/digital conversion technique to determine the speed of a tire passing over a hose across a roadway in U.S. Pat. No. 4,862,163. Bean and Rorabaugh advance the state of portable traffic recording in U.S. Pat. No. 4,916,621, with a microprocessor based device which can operate in either a field mode or office mode. However, this disclosure relies on conventional air hose traffic switches or detector loops for traffic detection. In U.S. Pat. No. 4,947,353 Quinlan uses a combination of laser optics and a mechanical treadle to categorize vehicles by size and number of axles for an automatic toll booth collection system. Gebert et. al. disclose the use of piezo-electric crystal bearing cables buried in the highway to measure vehicle count, size and speed in U.S. Pat. No. 5,088,666. Again, numerous differences exist in the method and area of detection and remote capability compared to the instant invention. Another toll booth identification system is disclosed in U.S. Pat. No. 5,083,200 in which Deffontaines uses multiple photoelectric planes. In U.S. Pat. No. 5,170,162 Fredericks discloses the use of multiple motion detectors and CPUs to detect vehicles traveling the wrong way on a highway. This system flashes a warning to the errant motorist and even includes provisions, for a radio link to a base station to alert law enforcement. While this patent approximates a few of the features of the instant application, it differs in many ways, including object, detection system, data recording and reporting. Further Fredericks makes no attempt to measure speed or infer the size or nature of the traffic. In U.S. Pat. No. 5,173,692 Shapiro et. al. disclose a microprocessor based system for the overhead measurement of vehicle count and size for traffic control purposes. Again, Shapiro makes no attempt to measure many of the traffic parameters covered by the instant invention.

A wide variety of photocell or energy beam based devices are disclosed for specific vehicle racing or athletic event timing applications. Although similarities exist in the basic method of detection technology, these patents are dissimilar in object, field and scope. However, the devices disclosed in certain patents may, if fact, be usable as subcomponents of the instant invention.

No prior art searched incorporates the manifold objects and advantages of the instant application. While each disclosure had its specific objectives, none combines the ability to simultaneously measure approximate speed, size and direction of object travel, all without requiring the physical presence of detectors in the area being monitored. Another characteristic common to the prior art is the capability to monitor traffic only is very specific or restricted areas. Specifically, traffic must pass an exact spot to be counted by prior art. In contrast, present invention is capable of monitoring a span of several hundred feet. Further, cited references generally lack the capability to communicate data over long distances, store data, and produce reports as required. Much prior art relies on television photography. Finally, monitored area components of the present invention may be portable, self powered, and concealable. This provides the potential for observing without being observed.

OBJECTS AND ADVANTAGES

The object of the present invention is to provide a means for the remote, unmanned detection, enumeration and characterization of moving objects within one or more monitored area.

A further object of this invention is to provide estimates of the speed, direction and size of intrusion objects or traffic at one or more remote locations, and data relative to the volume and time of such activity. A further object is to provide instantaneous warnings of intrusions when desired. A further object is to provide summary reports and long term storage of historical data relating to such intrusions and traffic in monitored areas.

A further object is to measure data on air temperature and chemical agent levels at remote monitors coincident with the time of intrusions, and to transmit said data to the base station. A further object is to obtain photographic images of intrusion objects being monitored.

A further object is to accomplish the foregoing objects with portable, self-powered devices which do not require permanent installation or external power sources. A further object is to perform said detection in such a way that the subjects being detected are unaware of the monitoring activity.

A further object is to accomplish all of the foregoing objects while minimizing the risk of personnel exposure to potentially hostile encounters with the intrusions or traffic being monitored.

BRIEF DESCRIPTION OF THE DRAWINGS

An understanding of the: specific nature of the present invention, as well as other advantages, objects and applications of the invention may be gained from the following descriptions of the accompanying drawings. In addition, these drawings serve to differentiate and distinguish the present invention from the prior art of cited references in the general field of invention.

DESCRIPTION OF THE PREFERRED EMBODIMENT

Figure 1:
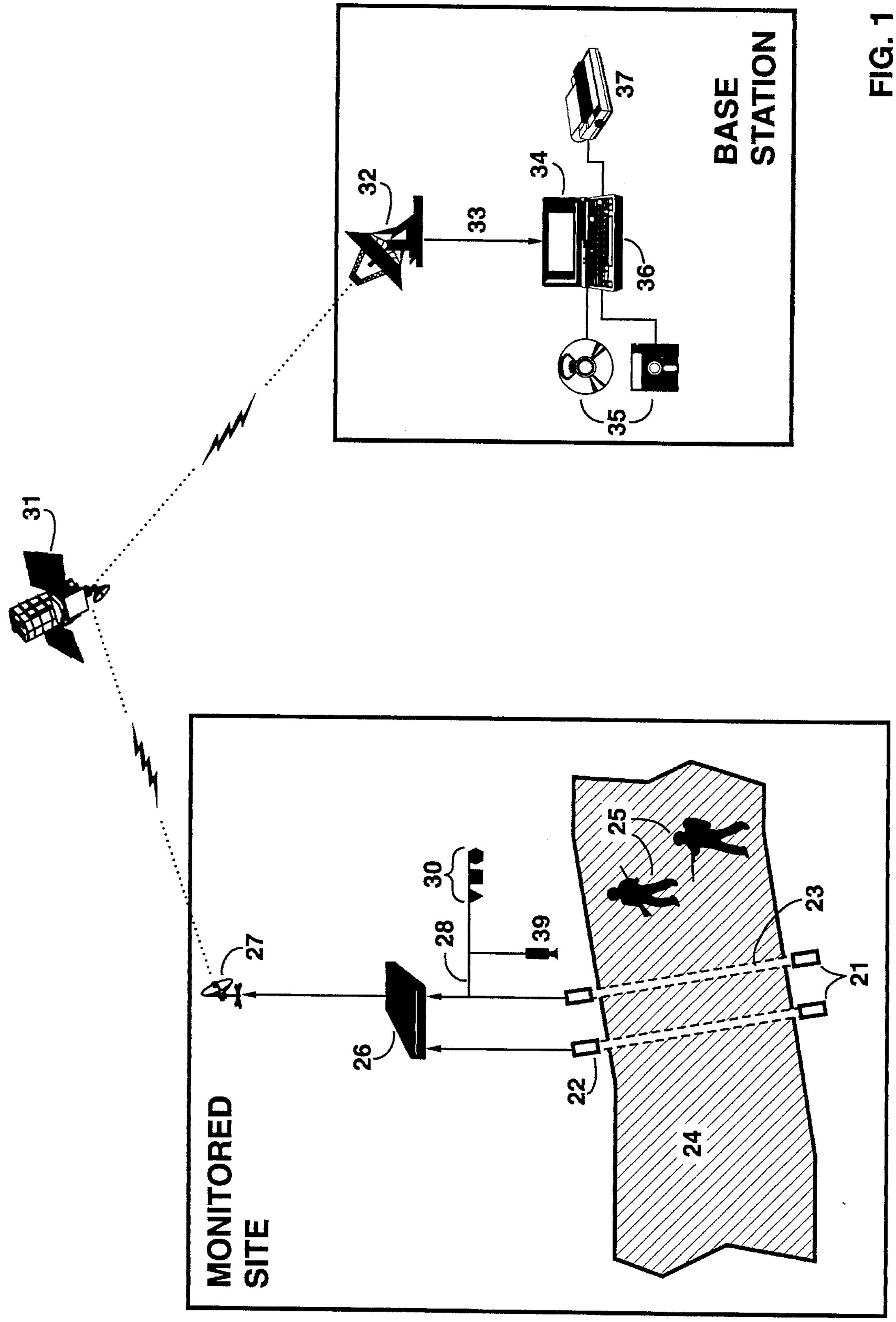
FIG. 1 is a general layout of major components and subsystems comprising the present invention using a communication satellite data link. This layout is also typical of an RPS using RF or hardwired communication links except for communication link components.

Referring to FIG. 1, a monitored site contains one or more object sensor, each consisting of an emitter 21 and a receiver 22. The emitter transmits a beam of energy 23 of a specific wavelength, and polarization. To prevent detection and to minimize sensitivity to ambient light changes, the energy beam is generally characterized by a wavelength specification outside of the spectrum of human vision. Included in such specification are infrared, ultraviolet, microwave and certain laser energy sources. A beam may be broad to facilitate non-critical alignment, or focused to limit dispersion for optimum long distance operation. The monitored area 24 is defined by the placement of emitter/receiver pairs (object sensors) and the physical characteristics of the area.

The receiver "sees" its paired emitter only in the absence of nontransparent object(s) 25 interrupting the beam. The receiver is tuned to acknowledge only the specific energy wavelength, pulsed modulation frequency or polarization of its paired emitter. Accordingly, sources of extraneous energy such as daylight, lightning strikes, headlights, and RFI, do not affect the object sensor operation.

In the opposed mode, the emitter and receiver are positioned at opposite sides of the area to be monitored 24 with the emitter beam directed to the receiver. This arrangement maximizes the useful range that can be monitored and optimizes performance under unfavorable environmental conditions. In an alternate retroreflective configuration, the emitter and receiver are mounted side-by-side or combined into a single unit. A reflector on the opposite side of the monitored area reflects a portion of the energy beam back to the receiver. The receiver "sees" the reflected beam in the absence of an opaque object between the emitter/receiver and the reflector. Each emitter and receiver has an associated or integrated power supply consisting of either rechargeable or disposable energy cells, providing voltage appropriate to the devices specifications. Self contained power supplies also operate a data log 26 and a remote transceiver 27. Cables 28 link the receiver output to the data log. An optional camera 29 and environmental sensor module 30 may be arranged to record the status of the area being monitored when a receiver indicates an intrusion event.

The data log time stamps intrusion event data and relays stored data to the transceiver 27, which comprises a portion of the communication link. The communication link transmits data between the monitored area and a base station transceiver 32. The communication link may be hardwired, radio frequency or satellite link. In a hardwired communications link, a cable connects remote monitor(s) to the base station. Communication protocol may be similar to telefax/modem transmissions using an open line. Direct Radio Frequency (RF) broadcasts use a modified commercial band, military frequency, marine band or similar mobile radio with antenna and a self contained or external power source. Satellite link broadcasts may be sent through a commercial satellite network 31, or military satellite channels if applicable to the user.

A coaxial cable connection between the data log and transceiver carries event delta being released for transmission. Transceivers and antennas for both RF and satellite communications links 31 may be located some distance from the object sensors where such separation increases the effectiveness of object sensor and system concealment.

The monitored area transceiver may transmit digital or modulated data, depending on the nature of the communication link. For example, the communication link may use the V32 BIS standard with a streamlining protocol such as Zmodem. Data received at the base station transceiver 32 is demodulated if previously modulated and placed into an input buffer in a base station computer 34. From here data is sent to a raw historical record file or streaming tape within the computer. Data is also sorted to determine the remote monitored site of origin. Operator interface through devices such as a keyboard 36, mouse or digitizer pen govern RPS operation modes. A printer 37 provides hard copy of present or historical RPS activity upon command.

Upon setup of a monitored site of multiple object sensor configuration, RPS operators record certain data for input to the base station computer.

The normal object sensor operating mode across a monitored area with an uninterrupted beam is referred to as a "light" condition. An encroachment of the beam by a non-transparent object sufficient to turn off the receiver causes a "dark" condition, which is an exception condition. The timing and duration of dark conditions serve as the basis for essentially all RPS traffic data collection, transmission, interpretation, analysis and reporting. Upon changing to the dark condition, the receiver portion of the object sensor output inverts from its normal voltage state. The receiver output is connected to the data log, which senses the inversion and initiates an "event" by applying a Time Initiating (TI) clock value to the time that the dark condition began. The event continues until the dark condition ends, whereupon the receiver output voltage reverts to normal. The reversion causes the data log to apply a Time Ending (TE) clock value to the then completed event. The data log has a separate reception channel for each object sensor. Each event is automatically encoded to indicate the originating object sensor. The TI condition may also trigger the data log to turn on a camera and sample environmental sensors if included in the RPS setup. Each of the sensors is sampled twice by the data log. If parity exists, the data log attaches the environmental readings to the traffic data.

The physical proximity of the object sensors in a two beam RPS configuration has significant potential for crosstalk illumination, wherein a receiver may be illuminated at times by either or both emitters. Crosstalk is eliminated by operating each adjacent object sensor on its own respective wavelength, modulation frequency or polarization. With such differential calibration, the receiver recognizes only the illumination source from its paired emitter.

Figure 2B:
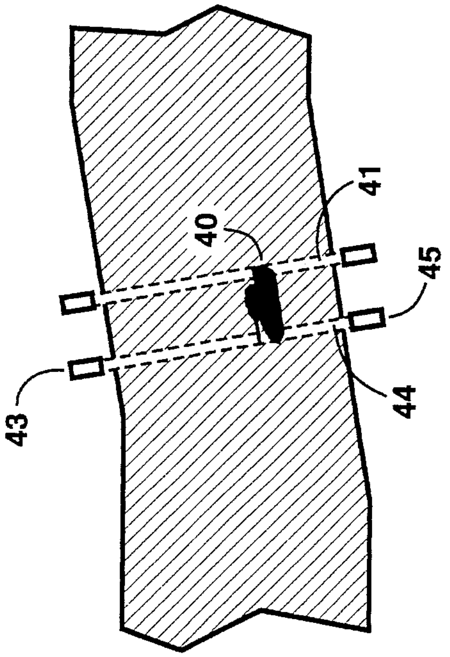
FIG. 2*a* through 2*d* provides symbolic representation of the sequence of chronological events which occur when the preferred embodiment of a two sensor configuration monitored site detects an apparent intrusion.
Figure 2D:
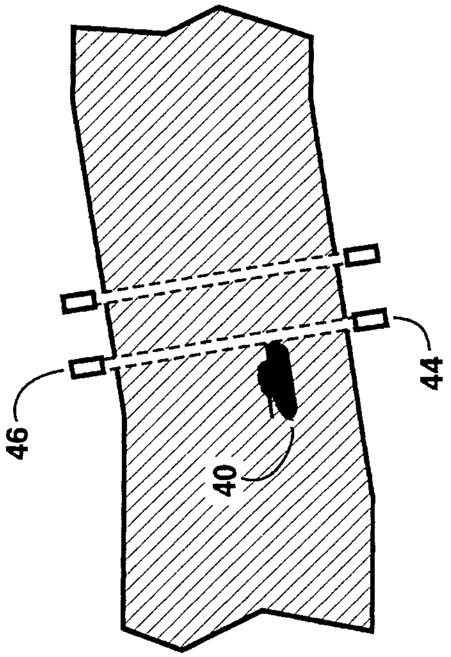
Figure 2A:
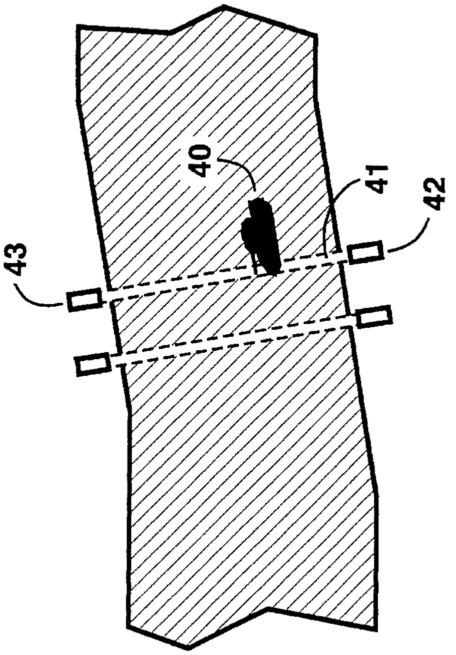
Figure 2C:
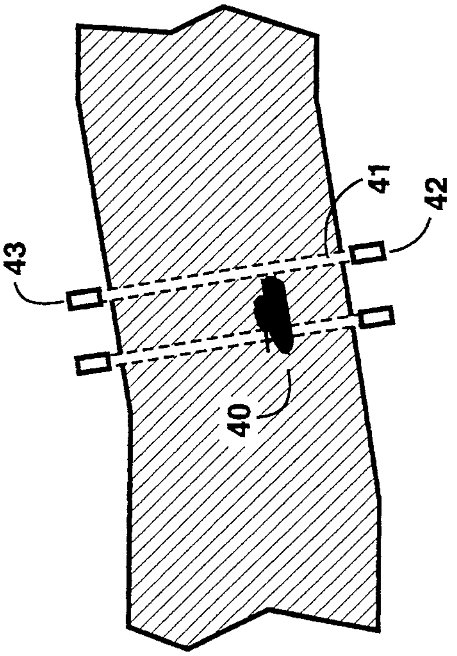
Figure 3:
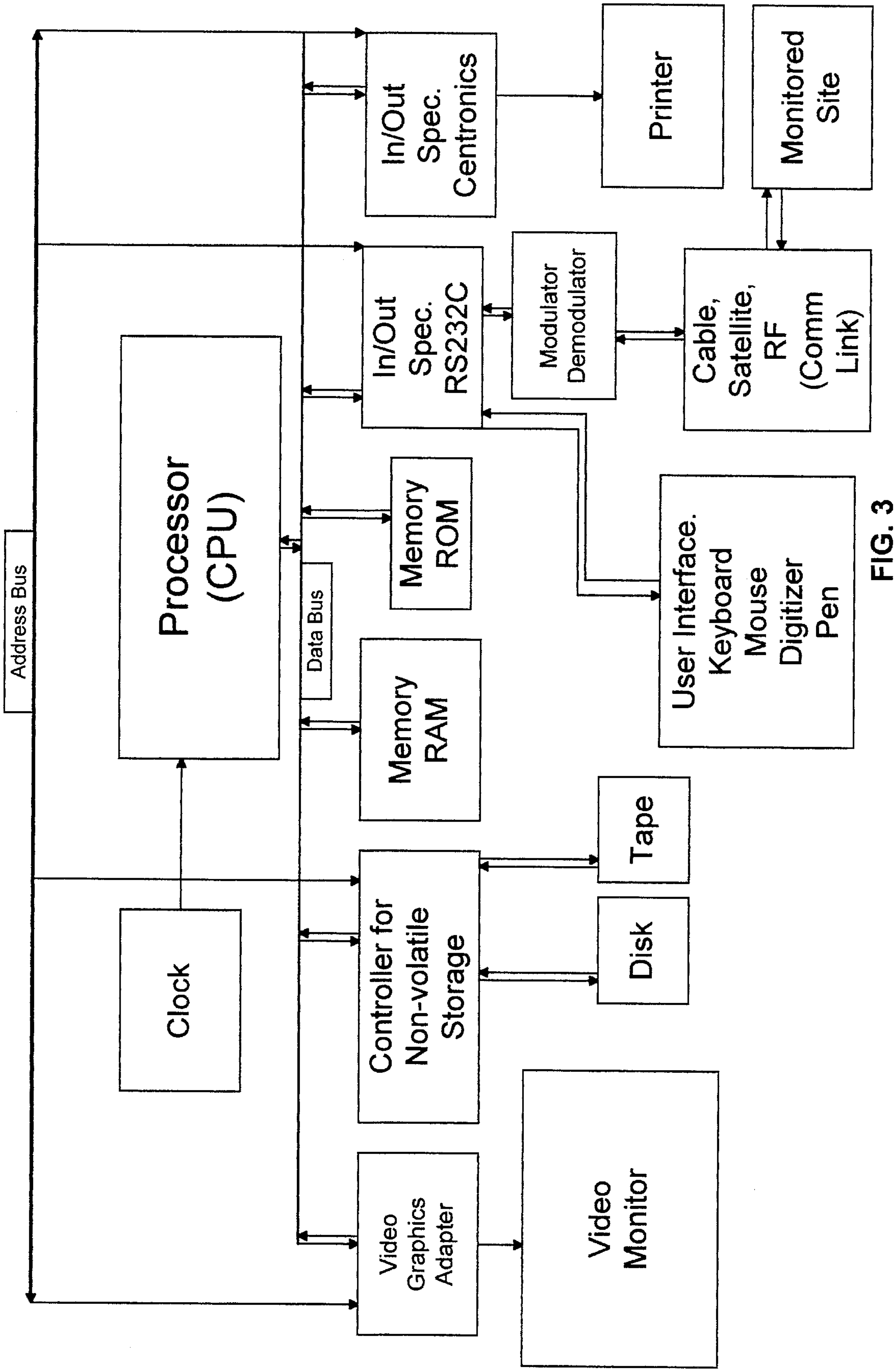
FIG. 3 is a functional block diagram of the operation of a base station.

FIG. 2*a* through 2*d* illustrates a typical sequence of RPS object sensor operation. In FIG. 2*a*, a non-transparent intrusion object 40 interrupts the beam 41 between emitter 42 and receiver 43, triggering a data log TI event/date related to that object sensor. In FIG. 2*b*, the intrusion interrupts beam 44 between emitter 45 and receiver 46. This creates a separate TI event with a later date. When the intruding object 40 moves clear of beam 41 and restores beam continuity as in FIG. 2*c*, the data log completes the event for the object sensor comprised of emitter 42 and receiver 43 by assigning a TE event/date. Similarly, restoration of beam 44 as in FIG. 2d generates a TE event/date in the data log. Each TI and TE event is coded to identify its originating monitored site. The monitored site CPU has the optional ability to encrypt the data, and compress it using a compression algorithm such as the Limpel-Zev or modified Huffman, and redundantly encode it, if appropriate for greater security and speed of transmission to the base station computer.

Data in the base station computer input buffer is transmitted to an expert system comprised of software code, a data base, and an operating system, all resident within the base station computer. The expert system processes, analyzes and interprets TI/TE events to develop estimates of the speed, horizontal size and probable identification of intruding objects.

A single object sensor RPS configuration generates data limited to the date and duration of intrusions. Storing and reporting this simplified data takes place in software subroutines designated for monitored sites having a single object sensor. The expert system interfaces with a database that identifies intrusions based on size and speed categories. This expert system determines the most likely object represented by the derived data. The expert system also assigns both an icon such as 25 in FIG. 1 and a corresponding object identification term or phrase to the event data.

Complete event data cells, comprised of raw TI/TE data, estimated speed, horizontal size, direction of travel and environmental data readings are sent to a screen report generator which displays the information by means of a title and an icon. The raw data, sorted by remote monitored site source is also sent to the screen report generator.

The RPS expert system further computes a statistical confidence level for each object identification, based on how well the speed and size of the intrusion fits data base parameters. The object designation and confidence level are saved in file form, and also sent to a hard copy report generator, which can be called as desired. Various screen views can be called upon by the base station software. These include a rasterized map showing the locations of the active and inactive remote sites, with various summaries of activity.

Base station software utilizes a graphical user interface with an event driven paradigm. Software code for monitored area data log is written in procedural form, with text based output to screen to conserve CPU power with a less complex operating system. The base station may control the monitored area data log through the communication link, including deactivation and reactivation.

Operation of a Monitored Site.

Setting up a remote station consists of:

1. installing and aligning emitter/receiver pairs (object sensors) to cover a monitored area, such as a trail, road, field, enclosure or other area suitable for energy beam monitoring;
2. installing an optional environmental sensor module and camera.
3. interconnecting object sensors, data log camera, environmental sensors and transceiver with appropriate cables;
4. selecting a data log transmission mode;
5. enabling the communication link transceiver;
6. enabling the power supplies on emitters and receivers, and;
7. reporting the geographic location of the monitored site, the distance between the object sensor pairs and the approximate compass orientation of the sensors to the base station. The distance between the object sensors is variable within certain software defined limits to permit concealment and camouflage by taking advantage of preexisting features such as flora, topography or construction. The geographic orientation of the emitter/receiver object sensor pairs must be also noted to allow the CPU and software to impute intrusion direction to motion events.

Installation and alignment of emitters and receivers comprising object sensors defines the physical parameters of monitored areas. Single object sensor configurations require no data on geographical orientation of object sensor layout or separation distance. Monitoredisite configurations having two or more object sensors require an approximately parallel beam After alignment of object sensors, operators interconnect data log and transceiver with cables, and activate power supplies.

A separate cable may connect the data log to the communication link transceiver, which may be located some distance away to minimize observability. Optionally, a video camera may be installed to record activity for time periods coinciding with beam interruption. The environmental sensor module contains a digital thermometer and wide spectrum chemical agent detector. This module connects to the data log with a multi conductor cable.

A RF transceiver using an antenna requires minimal setup and no antenna alignment. Similarly, a hardwired communications link requires only connection of a cable from monitored site(s) to the base station. Cables may be buried for permanent installations or simply emplaced for temporary installations. Setup of a satellite communications link requires substantial antenna alignment technology characterized by the technical and critical nature of earth-to-space communications. These operations are described in technical publications related to satellite communications gear.

The data log accumulates event data in a volatile memory device in accordance with preprogrammed instructions incorporated into the monitored site. A signal to transmit data may be triggered by: (a) passage of time, (b) occurrence of an event, (c) accumulation of a given volume of event data, or (d) a communication from the base station. The mode and timing of operation of the communication link is selected by the user, depending on the importance of timeliness in reporting traffic incidents. A transmission order in any triggering mode downloads all data from the data log memory for encoded transmission over the communications link. The volatile memory in the data log register is then cleared for the receipt of additional event data.

When an operator selects instantaneous reporting, event data downloads to the communication link immediately upon completion of an event. In the burst transmission mode, data is periodically transmitted over a brief time period to conserve transmission power and frustrate unauthorized third party attempts to locate radio transmission sources. Data transmissions are buffered to preclude the loss of data.

Operation and Data Flow at the Base Station

Figure 4:
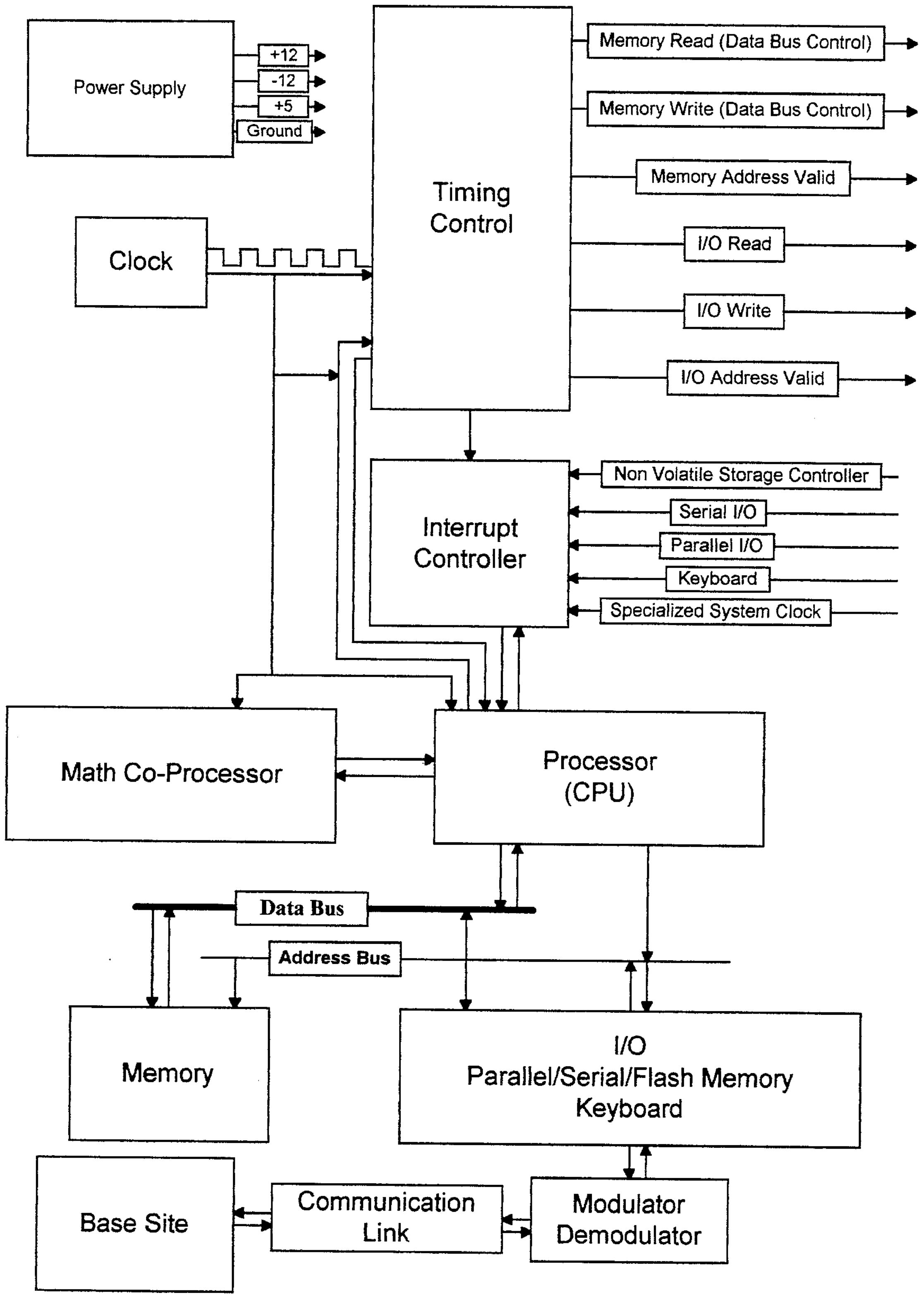
FIG. 4 provides additional notational block diagram relationships of the base station data processor components and data flows.

Upon power up, the base station computer (FIG. 4) automatically loads software from a data storage device to Random Access Memory (RAM). The computer also performs system checks to verify that a compatible user interface such as keyboard, mouse or pen and printer are connected. An optional user identification software routine may require a password ID to proceed with RPS operation. A main menu screen allows the user to access the features of the software package which permits the user to select RPS base station functions such as:

monitor existing remote stations for activity on a real time basis review the location(s) and calibration of remote monitor stations in existence add a remote monitor delete a remote monitor edit the parameters of a remote monitor save or retrieve historical data format reports print reports The user selects the desired operation and follows screen prompts to direct RPS operation. Operator decisions may be of a multiple choice nature, with selections made from a menu of options. Selections are made through keystrokes, mouse button clicks or digitizer pen. Operations involving adding or editing a monitored site require entering data parameters through the keyboard.

Data received at the base communications link is demodulated if it was modulated before transmission and stored in an input buffer. From the input buffer the data is processed in a manner appropriate to return it to its raw data form. If the data was encrypted or compressed it is decrypted or decompressed.

At this point the data takes several different paths within the base station computer. One path is straight to a sequential file or streaming tape. A second path is to a sorting routine. This routine checks the data stream for identification data. This identification data includes the location of the monitored site reporting the data, a time stamp for the data, a stamp for the type of data (TI/TE, environmental data, photographic), and the number of bytes of data in the packet.

The TI/TE data is sent to an expert system analysis module that determines probable horizontal length and velocity of the objects. Information from the database is consulted, and a vector or table-look-up best-fit determination is made. This object information is further processed by the expert system to determine a likely designation for the object.

The final result from the object designation expert system may include a confidence level, the value of which is a function of how well the velocity and length data match known objects and other database information. This object data format with the time stamp, monitored site identification, and confidence level is then stored in another file, and directed to the screen report generator for viewing if that window is active. It is presented as an icon and a meter of confidence level, and redundantly presented verbally. An option for other choices is available which sends the data back to the expert system for the next most likely possibilities to be listed in order, much as a spell checker for a word processor would do.

The data is then sent to a module of the screen report generator that is displayed as a window. The data is displayed as "raw graphic data". These windows can be multiplied by multiple document interface (MDI) to include information concurrently from multiple sites or multiple forms from an individual site. For instance, the user may order a rasterized image from a site in one window, environmental data in another, and TI/TE data in another.

For simplicity, FIG. 5 through FIG. 20 utilize a menu structure. The actual base station software uses a graphical interface. In addition to pull down menus, there are tool bars with icons. For instance, a tool bar with all monitored sites shown as icons is available. Inactive icons may be grayed out. Selecting a remote icon can make that monitored site active; selecting the active icon can bring up the report screens for that monitored site, along with menus for commands to give the monitored site.

Figure 20:
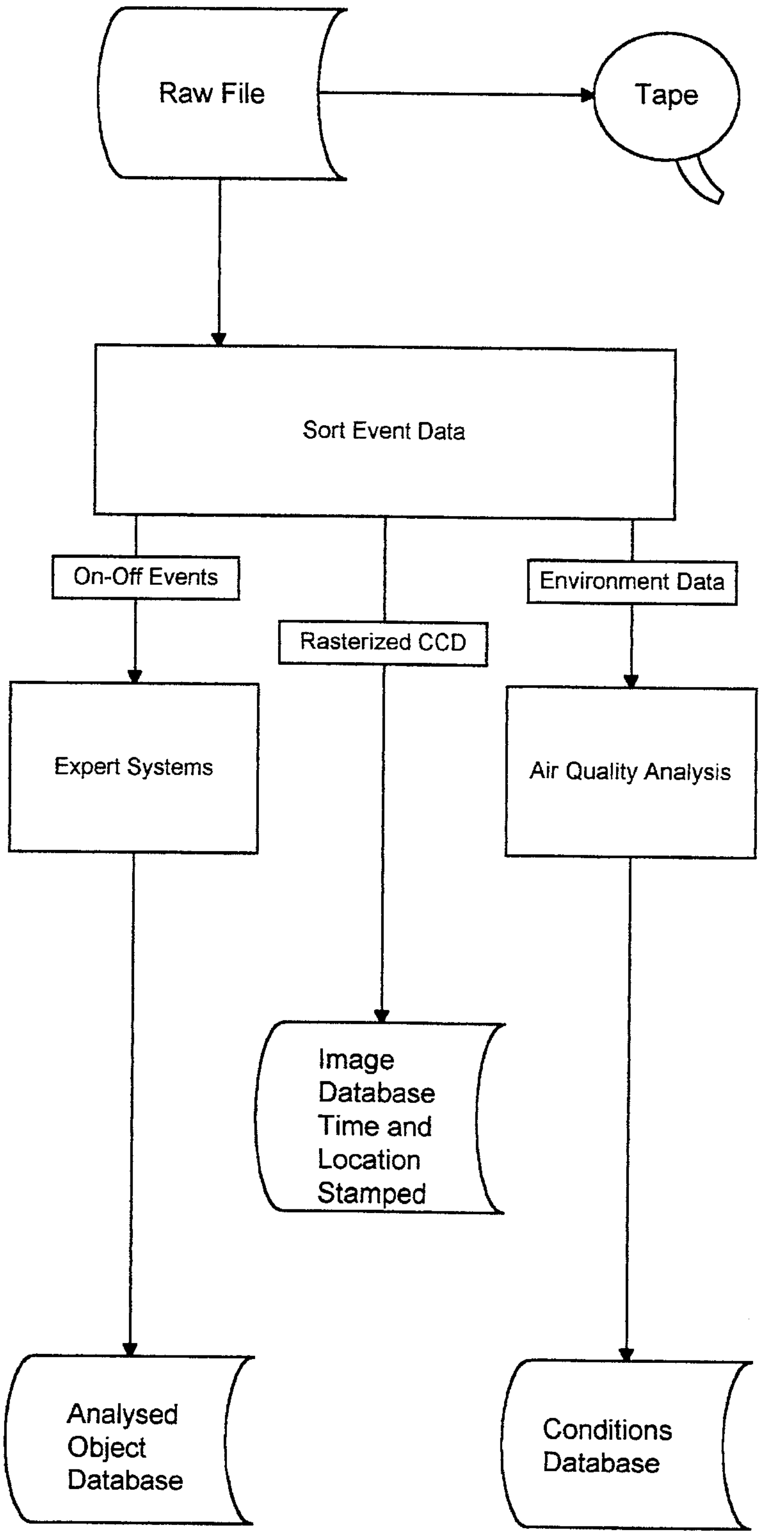

FIG. 5 through 20 use a hybrid user orientation/data flow diagrams to show the relevant organization of the base station software. FIG. 10 shows the general flow of data and operator access to the software. The program self boots when the computer is powered up. The input buffer is always active in the background, and is of sufficient size to prevent loss of data under the most intense foreground processor use. From the buffer, the data is directed to the raw file, and passes through to the other functions previously described which are shown in FIG. 20.

FIG. 10 also summarizes the menu. Each function on the menu cross references the FIG that provides additional detail on that particular function. The last menu function simply does an orderly job of cleaning up memory, closing and saving all files, and saving configuration options if they have been changed. FIG. 10 also shows how these modules output to screen, hard copy, and the remote stations.

FIGS. 11 through 20 depict the basic data flow structure, and interface flow between user, screen and hard copy generators, and databases, for each menu selection. Some of these use very similar structures. Therefore some structures are not redundantly covered for clarity and simplicity.

Data Flow at Monitored Site

Software in a monitored site data log CPU automatically loads from ROM when the CPU becomes active. Upon loading it defaults to a setup screen to assist in setup. A bar menu at the bottom of the screen shows the available options, which are:

Setup

Transmit Mode

Options

Done

Transmit mode allows the setup operator to choose whether to have the monitored site transmit on a regular timed, serial activity, or burst activity mode. Options allow the setup operator to choose whether to use compression, encryption, and redundant encoding, and whether or how environmental and photographic information is to be sent. These choices are also available from the base station on an override basis.

Figure 5:
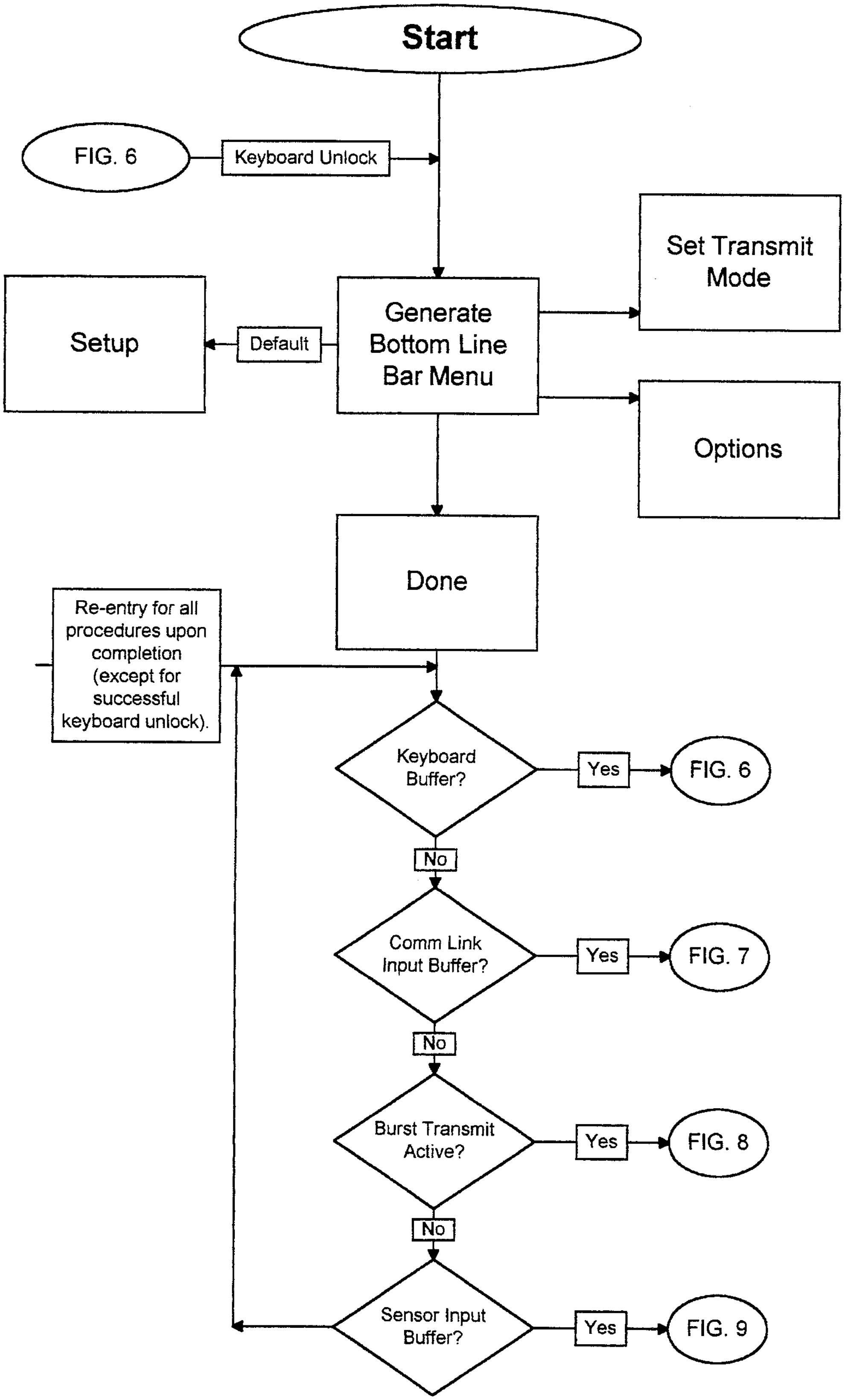
FIG. 5 through FIG. 20 chart the primary data flow of the major software operating routines enabling system operation in various modes. This figure also shows typical operator interfaces with RPS components. For clarity and simplicity, FIG 5 through FIG. 20 use a software menu structure.
Figure 6:
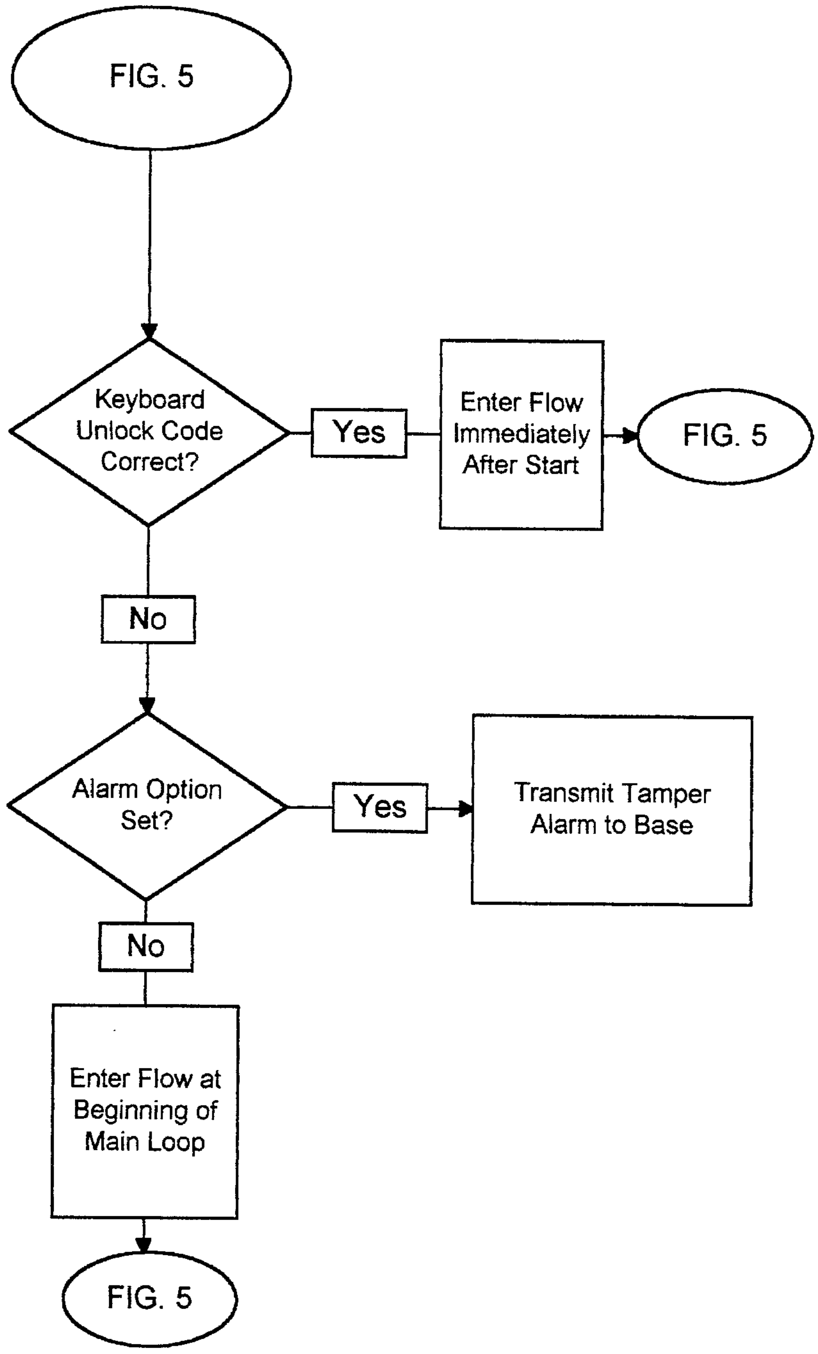
Figure 7:
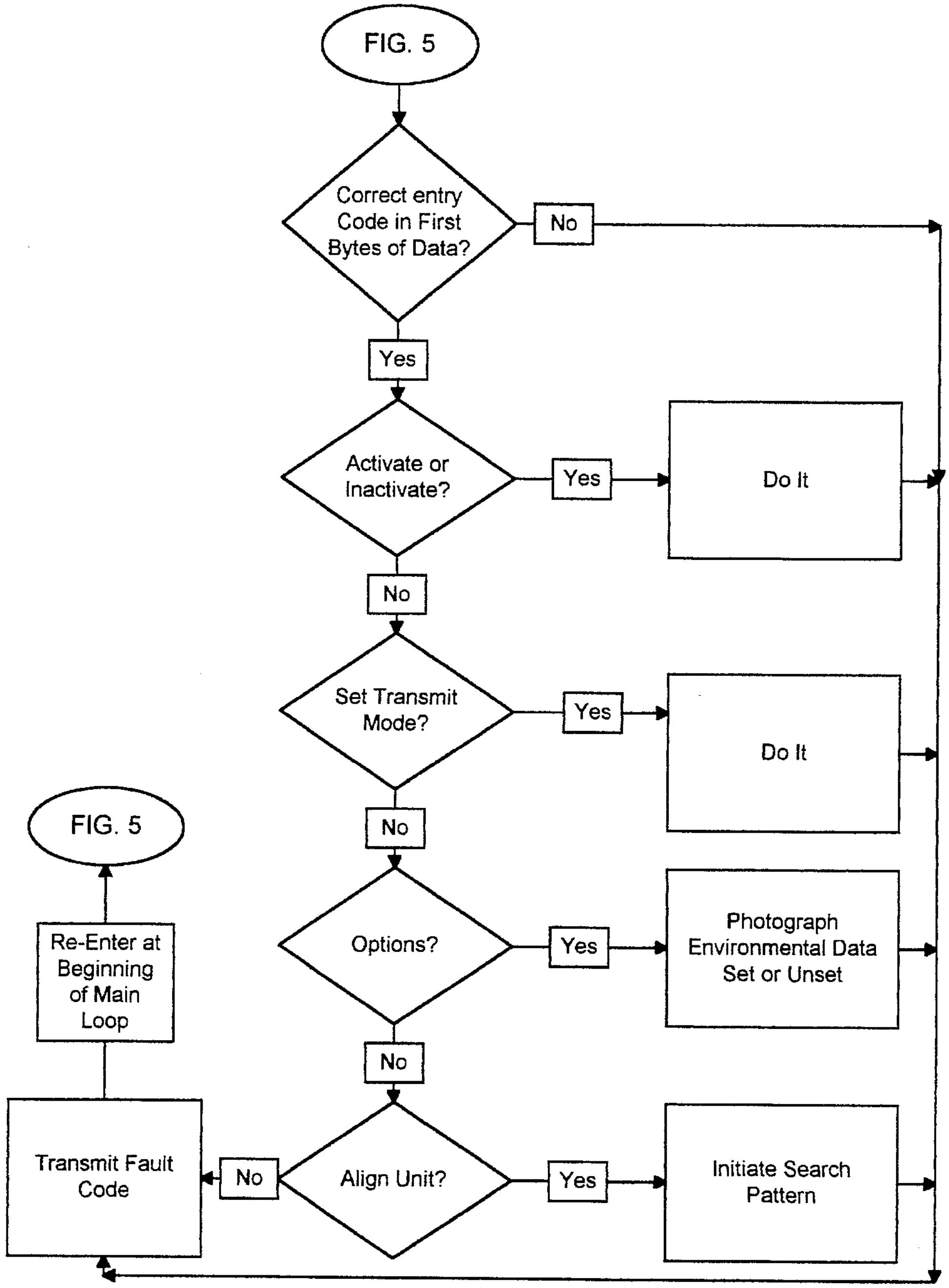

The data log software then polls input buffers from the keyboard, object sensors, and communications link to the base station, and if timed burst transmission is ordered, sets its own internal clock in a continuous loop. FIG. 5 depicts this general loop, while FIG. 6 shows an optional base unit tamper alarm loop.

Figure 8:
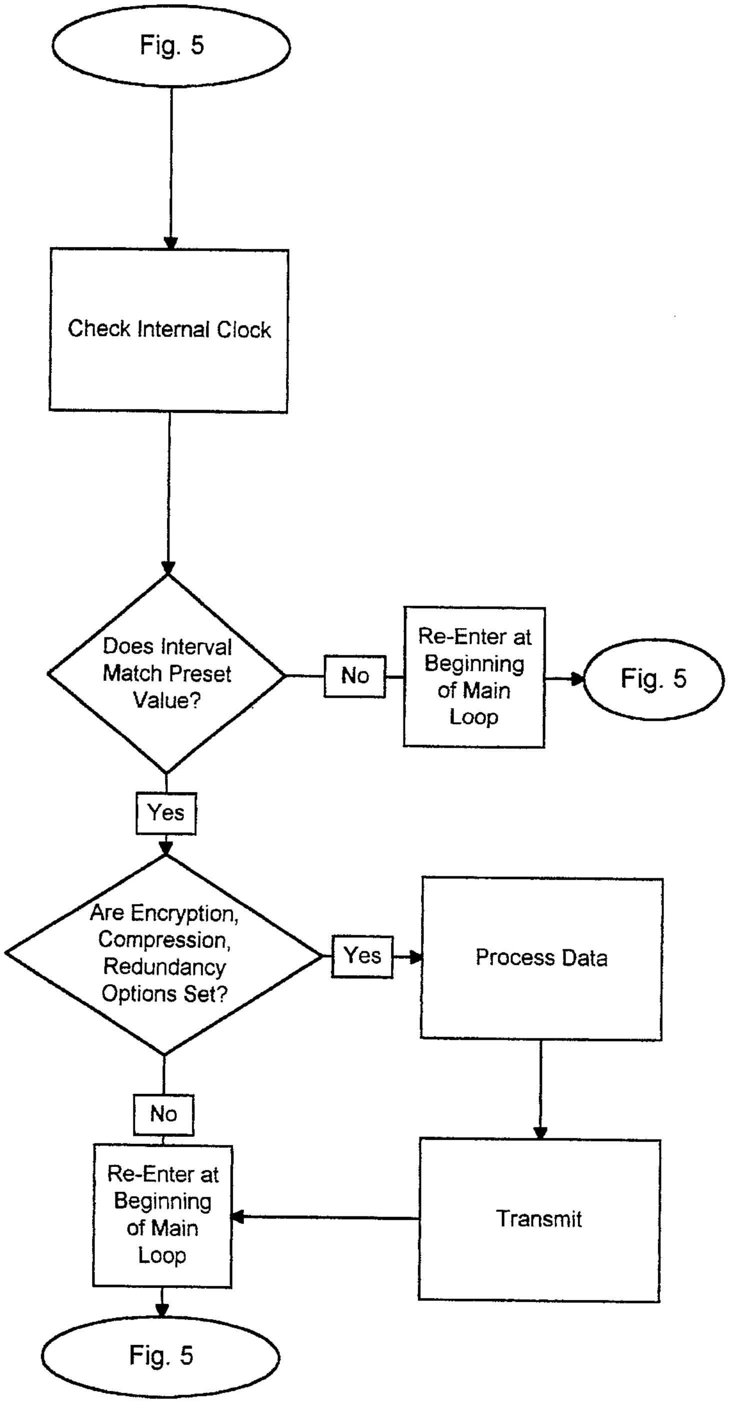
Figure 9:
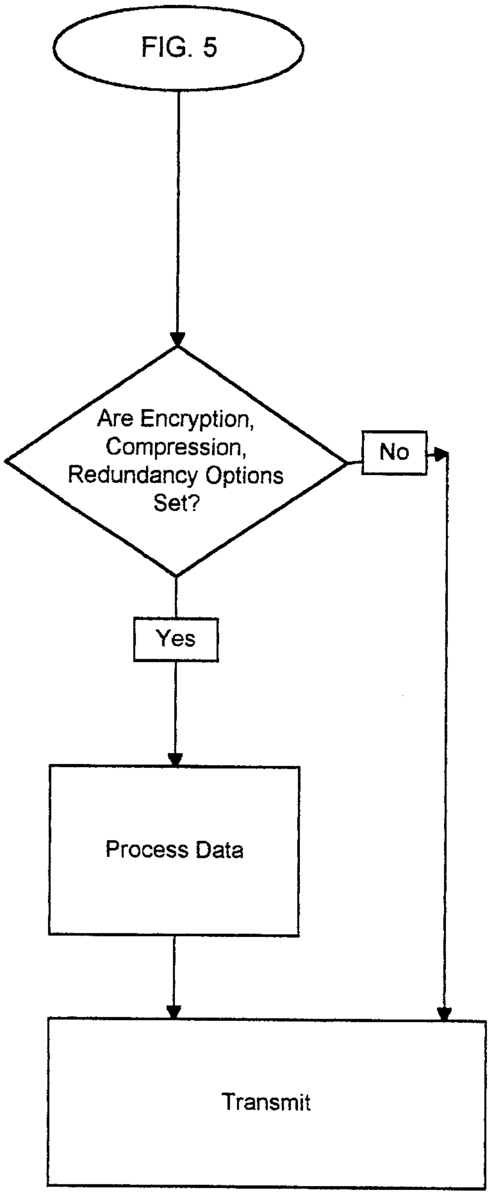
Figure 10:
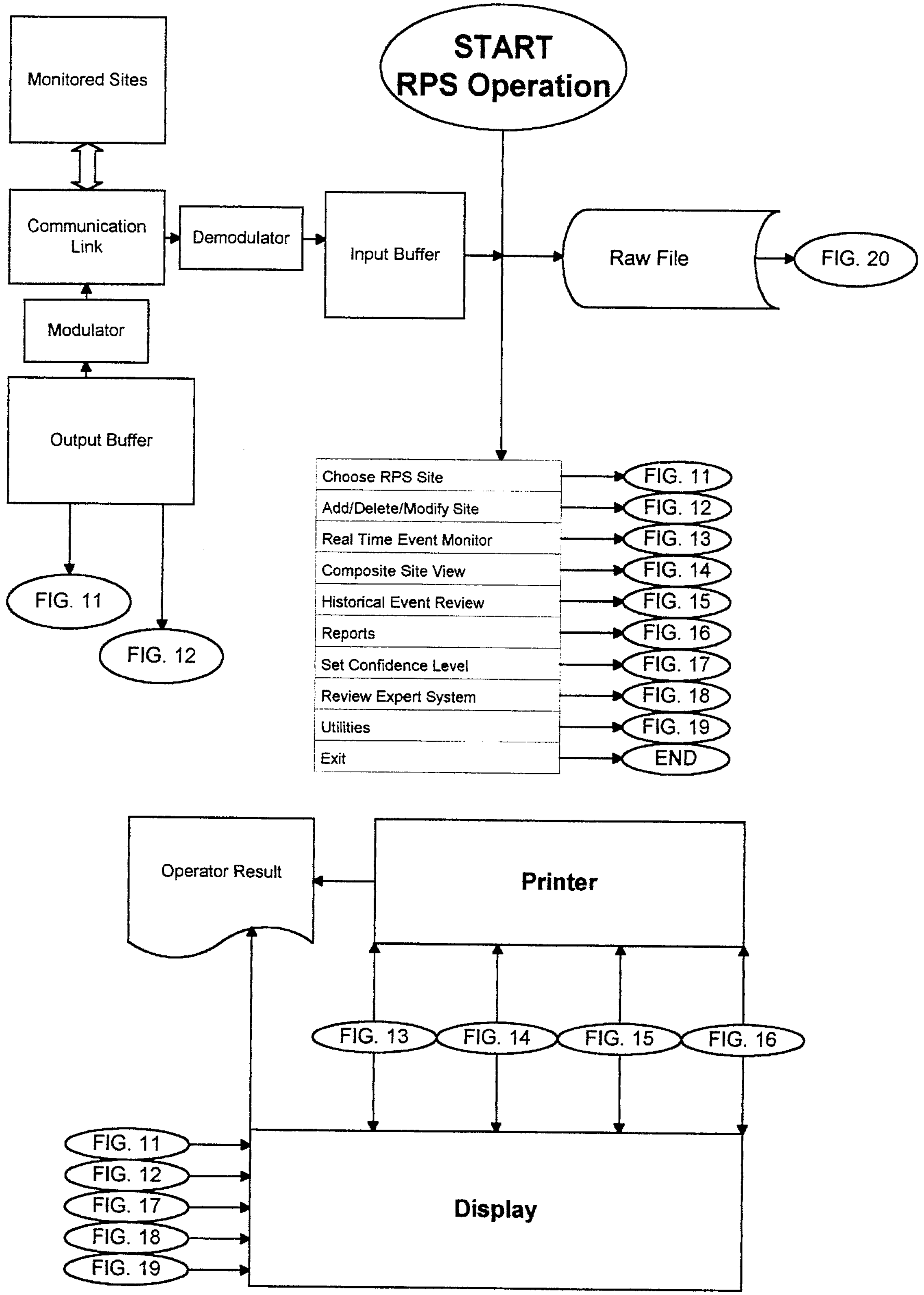
Figure 11:
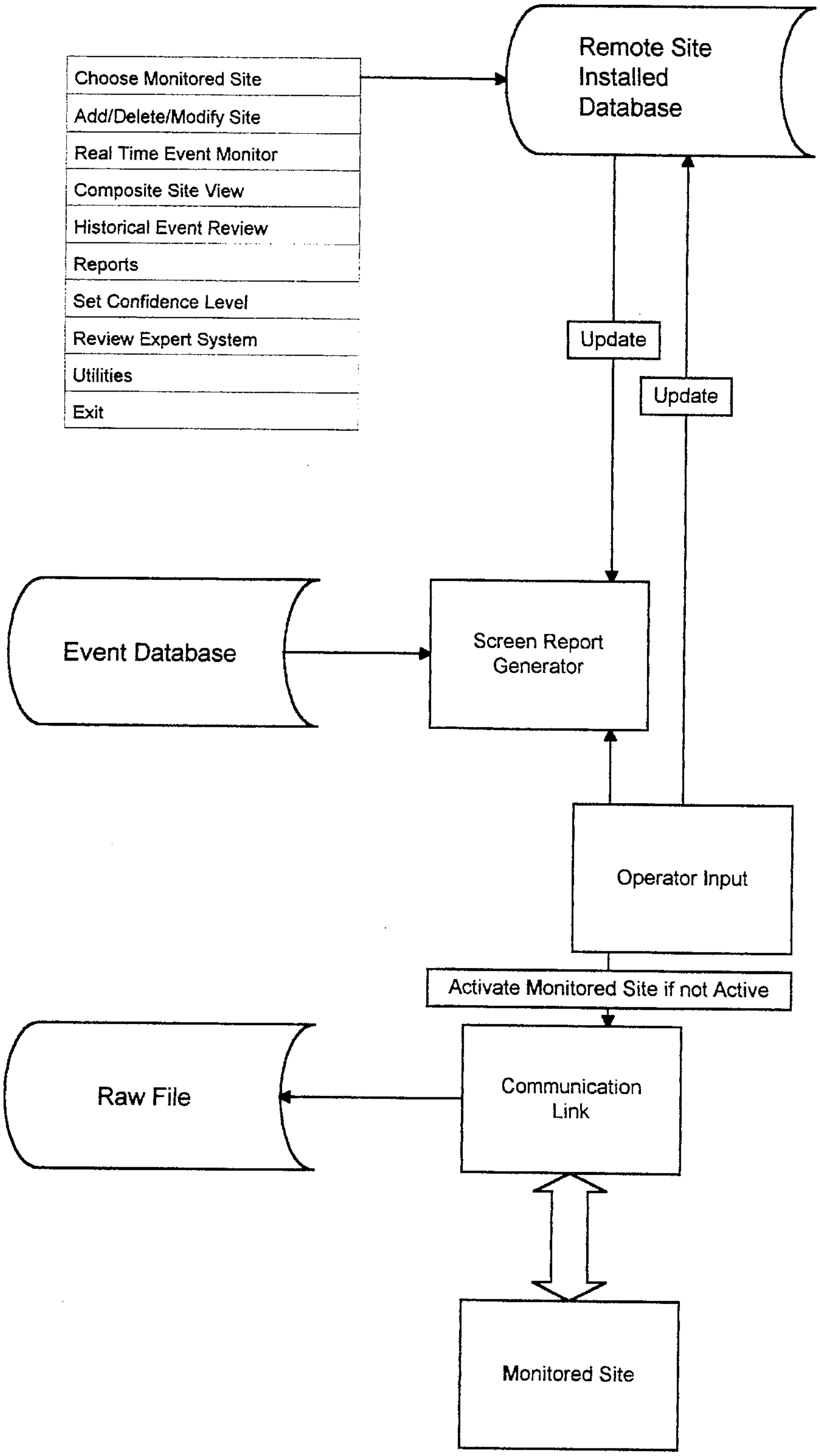
Figure 12:
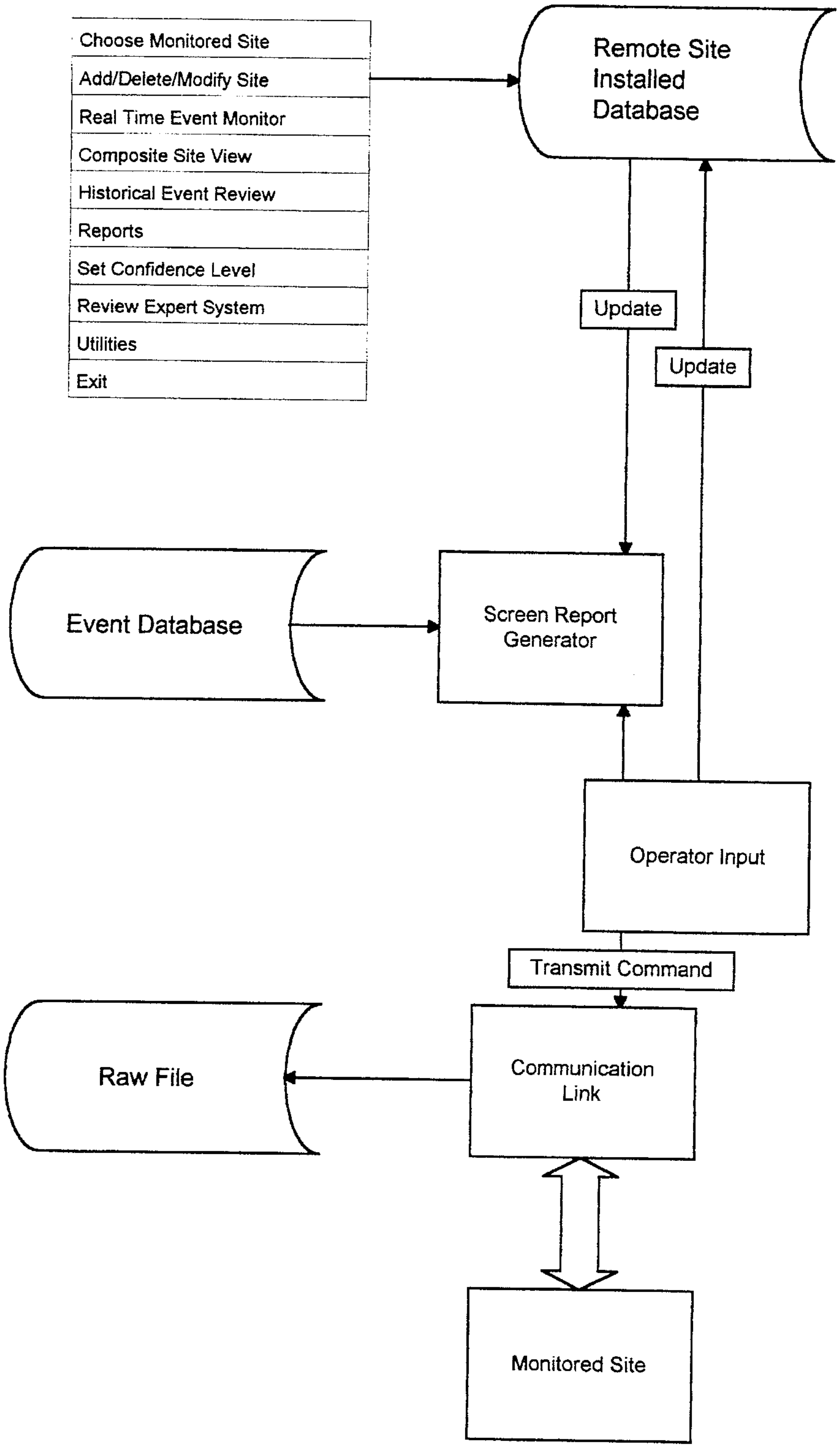
Figure 13:
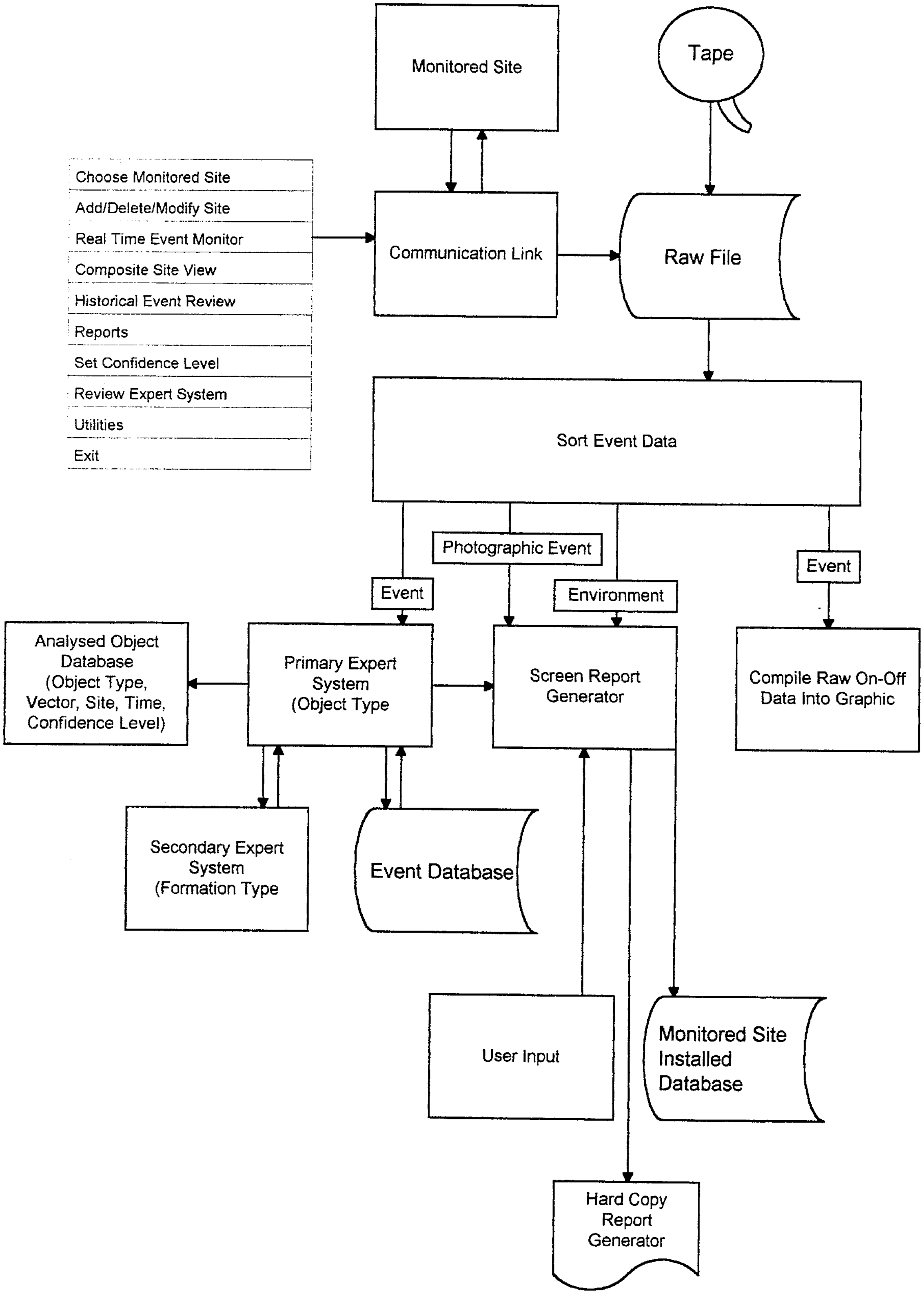
Figure 14:
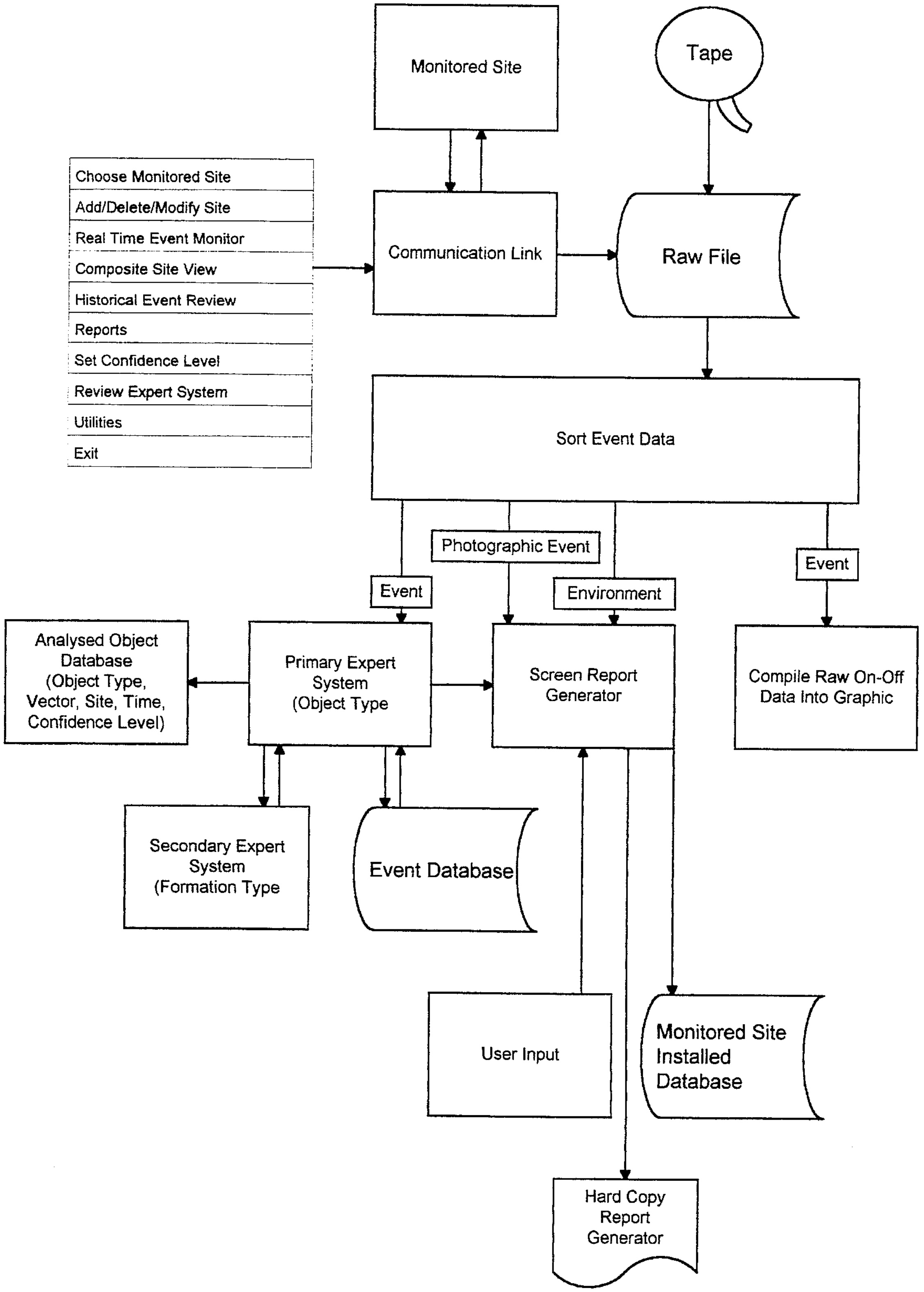
Figure 15:
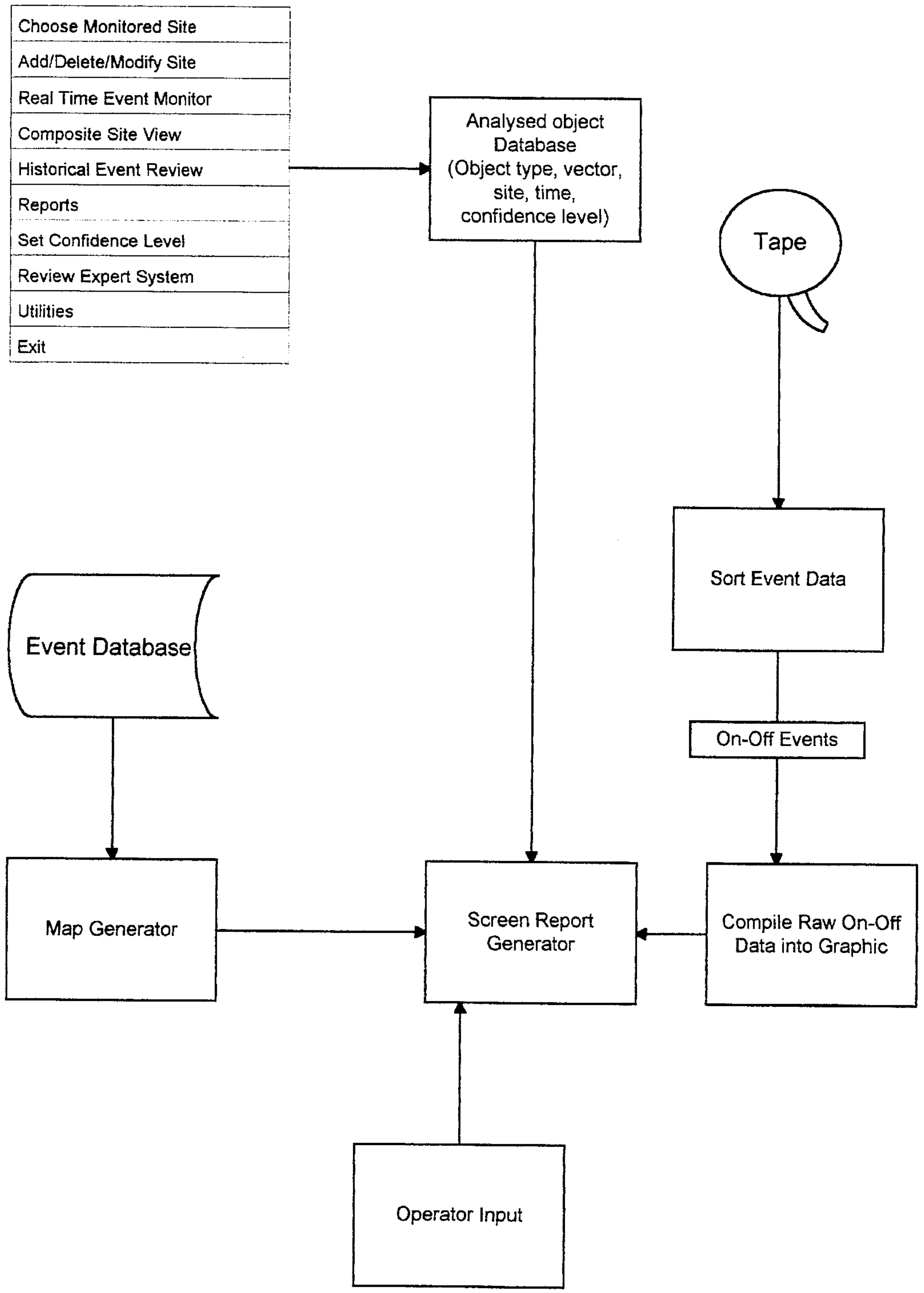
Figure 16:
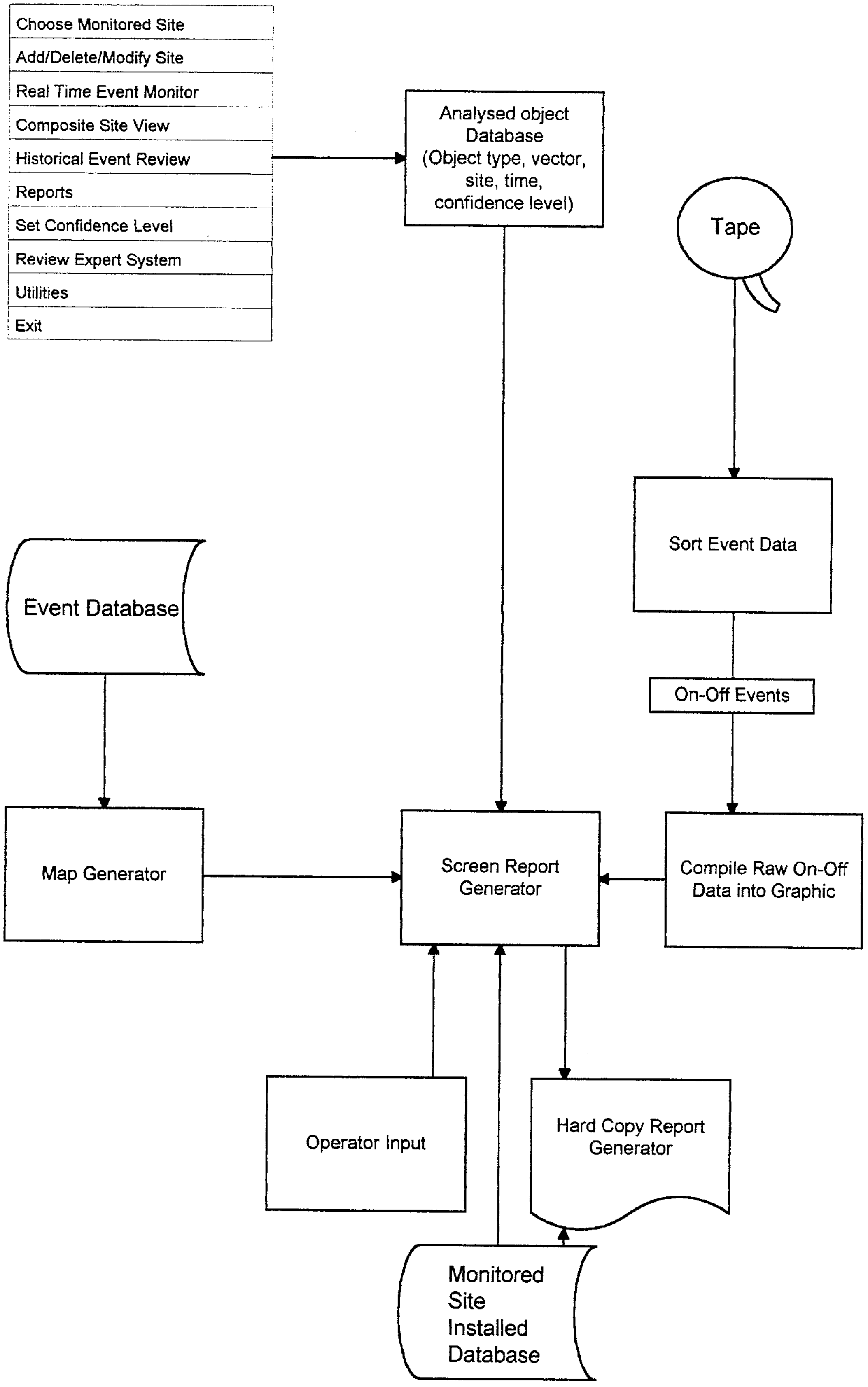
Figure 17:
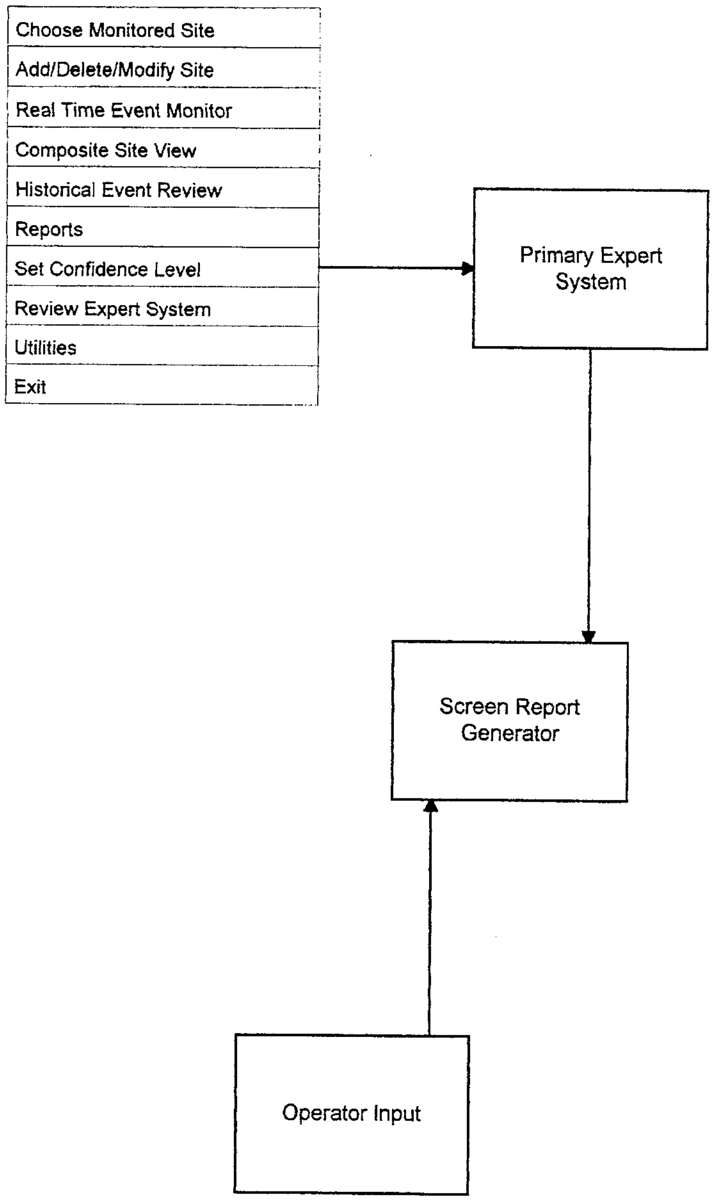
Figure 18:
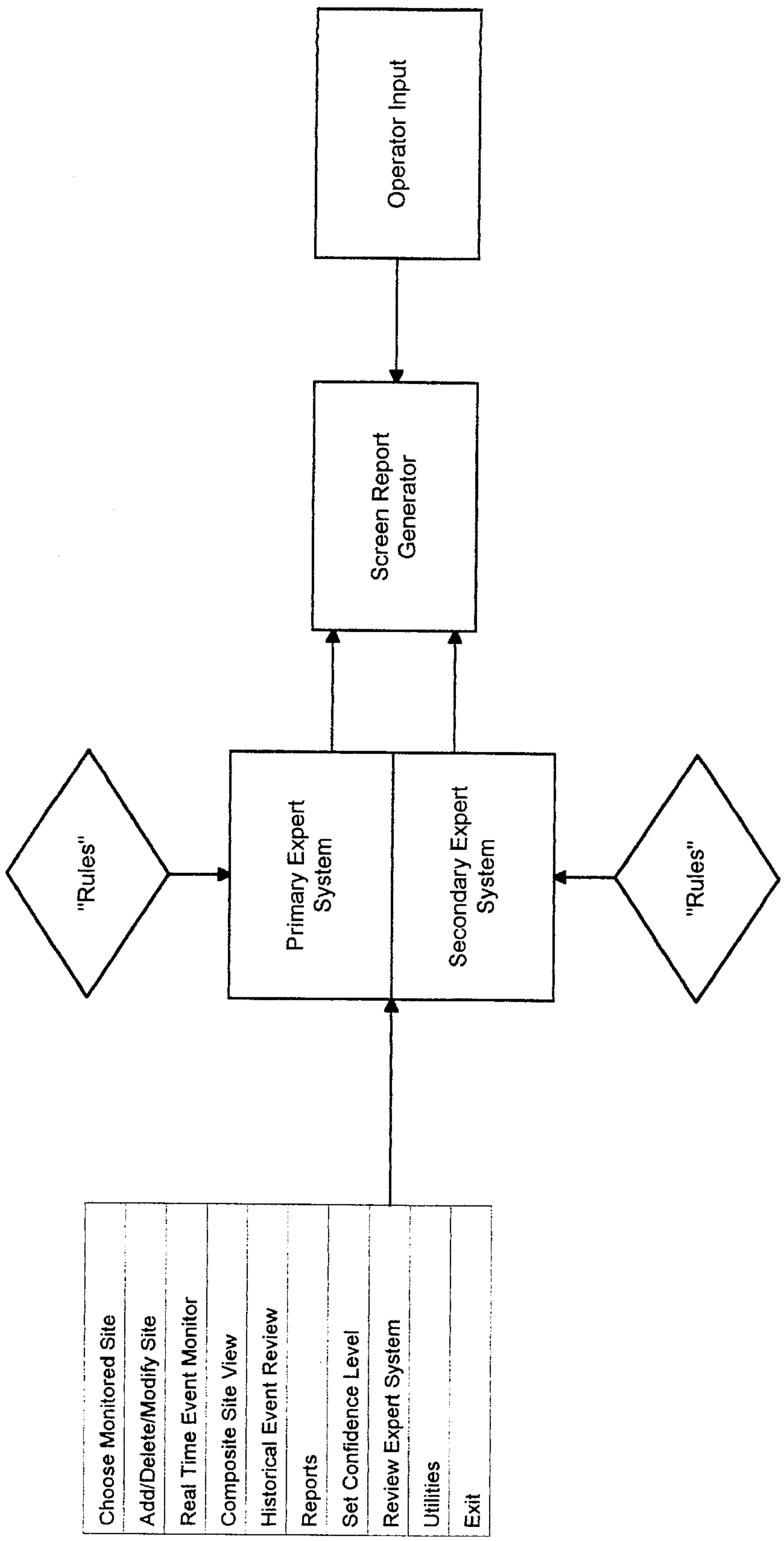
Figure 19:
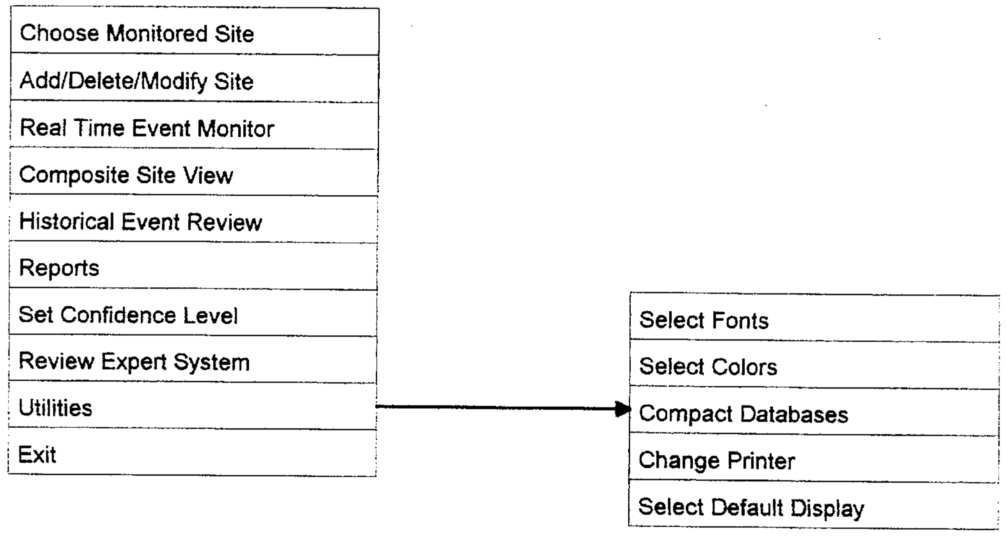

When information is found in the input buffer from the object sensors, it is stored or transmitted, depending on the transmission mode as shown on FIG. 8 and FIG. 9. When information is found in the input buffer of the communications link from the base station, it is decrypted, decompressed, and processed [acted on]as outlined in FIG. 7.

Detailed descriptions of RF transmitters, satellite transmission devices, and data log are not included with the instant application. As subsystems and components of the instant patent they are covered by their own patents and trademarks. Similarly, the object sensor components, environmental sensors and computer, data processor, data storage devices and operator interface devices may be standard or modified commercial items. Such components and devices, along with their associated publications on description, installation and operation are readily available from commercial sources and therefore are not redundantly described herein.

CONCLUSIONS, RAMIFICATIONS AND SCOPE OF INVENTION

From the above description, the reader will see that the Remote Patrol System provides a comprehensive capability for monitoring intrusion or traffic activity at sites which may be difficult, expensive, or dangerous to patrol with personnel. While the foregoing description contains many specifications, these should be interpreted as an exemplification of one preferred embodiment, rather than construed as limitations on the scope of the invention.

For example, apparatus and techniques for detecting object motion are well known in prior art related to photoelectric and laser devices. Commercially available motion detectors typically employ a source of energy such as infrared, ultrasonic, visible light, ultraviolet, laser, and RF including microwave. A wide variety of such devices could be substituted for the particular object sensors used in the instant reduction to practice, with varying results. Similarly, a most basic RPS system with hardwired communications link embodiment may consist of a portable personal computer (PC) for the monitored site data log, incorporating a modem, and a telephone line. The base station in such a particular embodiment may be comprised of a PC with modem, keyboard, mouse, monitor and printer, all operated by appropriate software. An RF communications link may be similarly established between base station and one or more monitored sites with two PC modems by using mobile phones. The incorporation of specially developed devices such as a uniquely designed data log or base station computer, which may, for example, ruggedize, miniaturize or optimize operation, may affect the functional utility of a preferred embodiment without affecting the RPS patent concept.

Accordingly, the instant invention can be substantially practiced by the interconnection and operation of primarily commercial devices, components and assemblies, all operated by appropriate software code as generally described by the specifications and drawings. Such devices and components, which are the building blocks for RPS are, in many cases, themselves the subject of patents, copyrights or trade secrets. These items are functionally interconnected, aligned, powered, and otherwise operated in accordance with their respective manufacturer's specifications, operating manuals, catalog sheets, and other technical publications. In many cases, multiple competing devices are commercially available, any of which could serve the requirements of a particular RPS configuration. The instant patent is the synthesis of the combination of these devices subcomponents and software code.

Similarly, this disclosure does not attempt to elaborate on the selection or detailed description of purchased components and subassemblies, nor the interconnection of said devices. The selection, application and connection of subcomponents described in the foregoing can be accomplished in accordance with the technical data furnished by each respective designer or manufacturer, by persons skilled in the art.

I claim:

1. An intrusion detection apparatus for detecting the presence of an object, comprising:

a. first energy projection means for projecting a first beam of energy along a first linear axis;

b. second energy projection means for projecting a second beam of energy along a second linear axis, wherein said second linear axis is substantially parallel to said first linear axis and is spaced a predetermined separation distance therefrom;

c. first receiving means positioned along the first linear axis at a predetermined distance from said first energy projection means, said first energy receiving means for receiving at least a portion of the first beam of energy projected by said first energy projection means, said first energy receiving means indicating an interruption in the first beam of energy when an object passes between said first energy projection means and said first energy receiving means;

d. second receiving means positioned along the second linear axis at a predetermined distance from said second energy projection means, said second energy receiving means for receiving at least a portion of the second beam of energy projected by said second energy projection means, said second energy receiving means indicating an interruption in the second beam of energy when an object passes between said second energy projection means and said second energy receiving means;

e. data log means coupled to said first energy receiving means and said second energy receiving means for storing data defining timing and duration of when said first energy receiving means indicates an interruption in said first beam of energy, and when said second energy receiving means indicates an interruption in said second beam of energy;

f. processing means located remotely from said data log means for processing the data log and for providing for user interface inputs and outputs; and g. communication means coupled to said data log means and said processing means for transmitting the data from said data log means to said remotely located processing means.

2. An intrusion detection apparatus according to claim 1 wherein said communication means periodically transmits energy interruption data from said data log means to said remotely located processing and user interface means.

3. An intrusion detection apparatus according to claim 1 wherein said communication means comprises an RF communication link.

4. An intrusion detection apparatus according to claim 1 wherein said communication means comprises a satellite communication link.

5. An intrusion detection apparatus according to claim 1 wherein the first and second beams of energy comprise beams of electromagnetic radiation.

6. An intrusion detection apparatus according to claim 1 wherein the first and second beams of energy comprise beams of light.

7. An intrusion detection apparatus according to claim 1 comprising a plurality of energy projection means and energy receiving means coupled to data log means.

8. An intrusion detection apparatus according to claim 1 wherein said processing means and user interface means includes one or more electronic data storage means, data retrieval means, data manipulation means data report creation means.

9. An intrusion detection apparatus according to claim 1 further comprising a chemical agent detection means and a photographic means.

10. An intrusion detection apparatus according to claim 1 further comprising a plurality of locations containing said energy projection and receiving means, said data log means, coupled to said means for communicating to said processing and user interface means.

11. An intrusion detection apparatus according to claim 1 wherein said data log means stores data defining both the time and the duration that said first energy receiving means indicates an interruption in said first beam of energy, and both the time and duration that said second energy receiving means indicates an interruption in said second beam of energy.

12. An intrusion detection apparatus according to claim 11 wherein said processing means determines the direction of travel of the object by noting which of the corresponding interruptions in the first and second beams of energy occurred first.

13. An intrusion detection apparatus according to claim 11 wherein said processing means determines the speed of the object by determining the time span between an interruption of the first beam of energy and a corresponding interruption in the second beam of energy, and dividing the corresponding time span by the predetermined separation distance between the first linear axis and the second linear axis.

14. An intrusion detection apparatus according to claim 13 wherein said processing means determines the approximate size of the object by multiplying the speed of the object by the duration of the average of the corresponding interruptions in the first and second beams of energy.

15. An intrusion detection apparatus according to claim 13 wherein said processing means determines the approximate size of the object by multiplying the speed of the object by the duration of a corresponding interruption in the first beam of energy.

16. An intrusion detection apparatus according to claim 15 wherein said processing means further comprises means for categorizing said object into a selected one of a number of predetermined categories, based on the speed and size of the object.

17. An intrusion detection apparatus according to claim 16 wherein said processing and user interface means includes means for displaying a predetermined icon on a user interface device after said categorizing means categorizes said object wherein the predetermined icon corresponds to the selected one of the number of predetermined categories.

* * * * *